United States Patent [19]

Wasilewski et al.

[11] Patent Number: 5,457,701

[45] Date of Patent: Oct. 10, 1995

[54] METHOD FOR INDICATING PACKET ERRORS IN A PACKET-BASED MULTI-HOP COMMUNICATIONS SYSTEM

[75] Inventors: Anthony J. Wasilewski, Alpharetta; Gary L. Logston, Tucker, both of Ga.

[73] Assignee: Scientific-Atlanta, Inc., Atlanta, Ga.

[21] Appl. No.: 177,943

[22] Filed: Jan. 6, 1994

[51] Int. Cl.⁶ ......................................................... H04L 1/00
[52] U.S. Cl. ......................................................... 371/37.1
[58] Field of Search ........................................... 371/37.1

[56] References Cited

U.S. PATENT DOCUMENTS

| | | | |
|---|---|---|---|
| 4,558,428 | 12/1985 | Matsumura et al. | 371/71 X |
| 4,723,244 | 2/1988 | Iacoponi | 371/37.1 |
| 5,090,025 | 2/1992 | Marshall et al. | 375/4 |

OTHER PUBLICATIONS

W. Stallings, *Local Networks*, 3rd. ed., Macmillan Pub. Co., 1990, pp. 185–186.
Wasilewski, Anthony J., "An MPEG-2 Multi-Program Multiplex Syntax", International Organization For Standardization, ISO/IEC JTC1/SC29/WG11 MPEG 93/173, (Jan. 6, 1993).

*Primary Examiner*—Stephen M. Baker
*Attorney, Agent, or Firm*—Woodcock Washburn Kurtz Mackiewicz & Norris

[57] ABSTRACT

A method is disclosed for providing packet error indication in a multi-hop communications system in which packets of data are transmitted from a transmission site to a reception site via a plurality of successive physical links. According to the method, at the transmission site, a pre-defined bit in a packet to be transmitted is set to a first value, the first value indicating that no errors are present in the packet. Then, at each successive physical link in the communication system, after transmission of the packet over that physical link, the following steps are performed: (a) detecting whether any uncorrectable errors occurred in the packet during transmission over that physical link; (b) if an uncorrectable error is detected, setting the pre-defined bit in the packet to a second value wherein the second value is indicative of an uncorrectable error in the data of the packet; and (c) relaying the packet to the next successive physical link for transmission over that next link. A decoder at the reception site may, upon receiving a given packet, examine the value of the pre-defined bit to determined the integrity of the data contained in that packet.

6 Claims, 4 Drawing Sheets

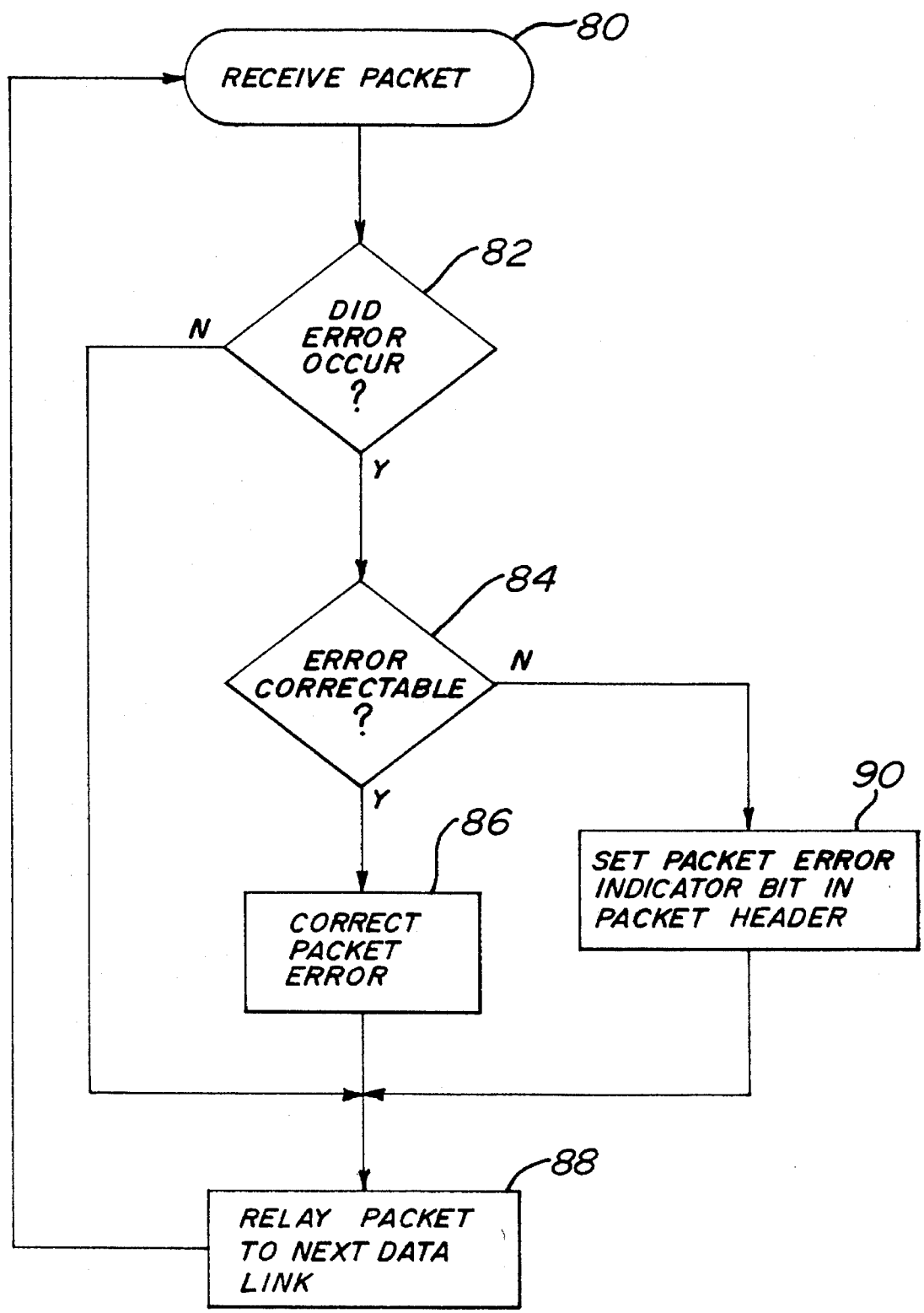

METHOD FOR INDICATING PACKET ERRORS IN A PACKET-BASED MULTI-HOP COMMUNICATIONS SYSTEM

BACKGROUND OF THE INVENTION

1. Field of the Invention

The present invention is directed to packet-based communications systems, and more particularly, to a method for providing packet error indication in a multi-hop communications system.

2. Description of the Prior Art

In a packet based multi-hop communications system, data is transmitted in packets from a transmission site to a reception site via a plurality of successive physical links. For example, in future digital subscription television systems, packetized video and audio data may be transmitted from a programmer site to a cable head-end installation via a satellite transmission system, and after reception at the head-end, may be transmitted to individual subscriber locations via a cable distribution network. The satellite transmission system and cable distribution network each define a separate "physical link".

Typically, prior to transmission over a given physical link, the packets of data to be transmitted are encapsulated in a "data link layer" (as defined in the International Standards Organization (ISO) Open System Interconnection (OSI) reference model (ISO 7498)) that provides, among other things, forward error correction capabilities. Essentially, a forward error correcting code is appended to each packet, or a series of packets, prior to launching the packets over the physical link. At the terminal side of the physical link, the error correcting code is employed to correct, if possible, any errors that may have occurred during transmission over that physical link. Popular error correcting techniques include Reed-Solomon block error coding and convolutional coding.

Although error correcting codes are capable of correcting certain data errors, some errors may be so extensive that correction is impossible. However, the error correcting techniques are at least able to identify such uncorrectable errors. In prior art multi-hop communications systems, when an uncorrectable packet error is detected by the receiving equipment of a particular physical link, the erroneous packet is simply discarded and the communications system must deal with the loss of that packet; most systems assume that the data in a corrupted packet is useless. However, certain kinds of data, such as coded video data, may be useful despite an uncorrectable data error, and it would therefore be desirable to allow packets having uncorrectable data errors to continue through successive physical links to the ultimate reception site. However, merely allowing a corrupted packet to propagate through the system presents a problem, however, in that there is no way of alerting the ultimate reception site that an error occurred during transmission of that packet over a one or more of the physical links. A need arises therefore for a method of providing an indication to a reception site in a multi-hop communications system that an uncorrectable error occurred during transmission of a packet over one of the physical links in the communications system. The present invention satisfies this need.

SUMMARY OF THE INVENTION

The present invention is directed to a method of indicating to a reception site in a packet-based multi-hop communications system whether an error occurred during transmission of a particular packet over one or more of the physical links in the system. According to the method of the present invention, prior to transmission, a pre-defined group of bits in each packet to be transmitted is set to a first value which indicates that no errors are present in the data of that packet, i.e., that the packet data is valid. For each packet, the following steps are then performed at each successive physical link after transmission of the packet over that physical link: (a) detecting whether any uncorrectable errors occurred in the packet during transmission over that physical link; (b) if an uncorrectable error is detected, setting the pre-defined group of bits in the packet to a second value wherein the second value is indicative of an uncorrectable error in the data of the packet; and (c) relaying the packet to the next successive physical link. A device at the ultimate reception site may, upon receiving the packet, examine the value of the pre-defined group of bits to determine the integrity of the data in the packet. In a most preferred embodiment, the pre-defined group of bits in each packet comprises a single bit and is located in the header portion of the packet.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 4 is a flow diagram illustrating one embodiment of the method of the present invention.

DETAILED DESCRIPTION OF THE PREFERRED EMBODIMENT

Figure 1:
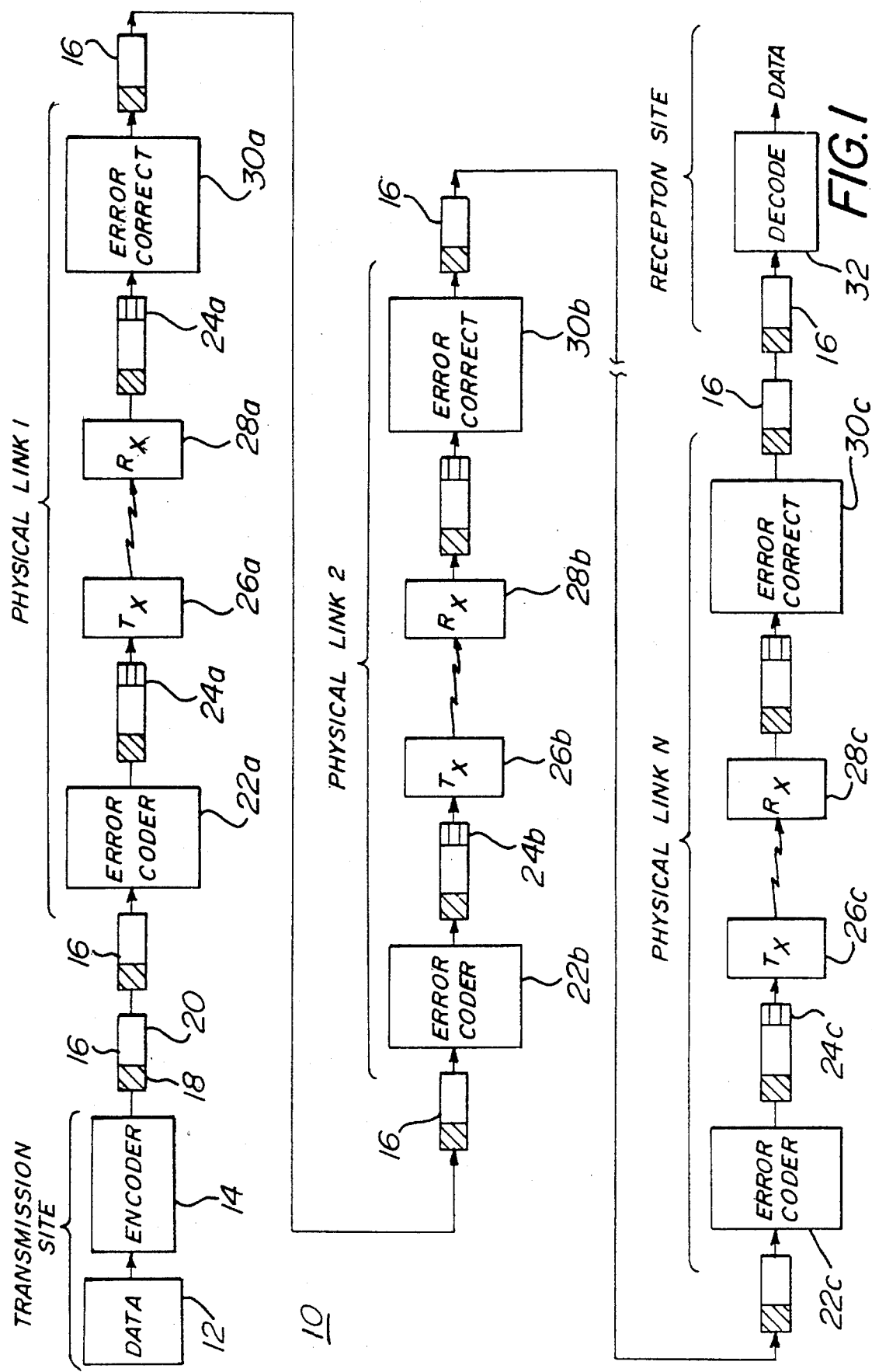
FIG. 1 is a block diagram of an exemplary packet-based multi-hop communications system within which the method of the present invention may be employed.

Referring to the drawings wherein like numerals indicate like elements throughout, there is shown in FIG. 1 an exemplary packet-based, multi-hop communications system 10 in which the method of the present invention may be employed. As shown, data 12 to be transmitted is provided to an encoder 14 which segments and packetizes the data 12 to generate a stream of packets 16 for transmission to a reception site. Each packet comprises a header portion 18 and a payload portion 20. Data 12 is carried in the payload portion 20 of each packet while the header portion 18 contains system-related information necessary for operation of the communications system and for recovery of the data 12 from each packet 16 at the reception site.

As further shown, each successive packet 16 is transmitted to the reception site via a plurality of successive physical links, e.g. PHYSICAL LINKS 1, 2 . . . N. As explained in the Background of the Invention, a given physical link may comprise a satellite transmission system, a cable distribution network, an optical fiber network etc. Each physical link provides error correction of packets transmitted through that physical link (typically by means of a data link layer as defined by the ISO OSI reference model). For example, considering PHYSICAL LINK 1, packets 16 to be transmitted over that physical link are provided to an error coder 22a prior to transmission. Error coder 22a operates in accordance with any known error correction technique, such as a Reed-Solomon block error technique or convolutional coding technique, to generate an error correcting code 24a for each successive packet. As illustrated, the error correcting codes 24a are appended to and transmitted with their respective packets 16. Each successive packet 16 is then provided to a transmitter device 26a for transmission over a respective physical medium.

At the terminal side of the physical link, a receiver 28a receives each successive packet 16 and provides each packet to an error correcting apparatus 30a. For each successive packet, the error correcting apparatus 30a employs the appended error correcting code 24a to detect and, if possible, correct any data errors that may have occurred during transmission of that packet over the physical medium. Assuming that no errors occurred, or that any errors that did occur were corrected, PHYSICAL LINK 1 will relay the packet to the next physical link (e.g. PHYSICAL LINK 2) for transmission over that link. Transmission of each packet will continue in this manner until the packet reaches the designated reception site. As indicated by the use of subscripts 'a', 'b' and 'c' in FIG. 1, each successive physical link may employ its own error correction and transmission techniques. At the reception site, a decoder 32 may be employed to recover the data 12 from the payload portions of each incoming packet 16.

Figure 2:
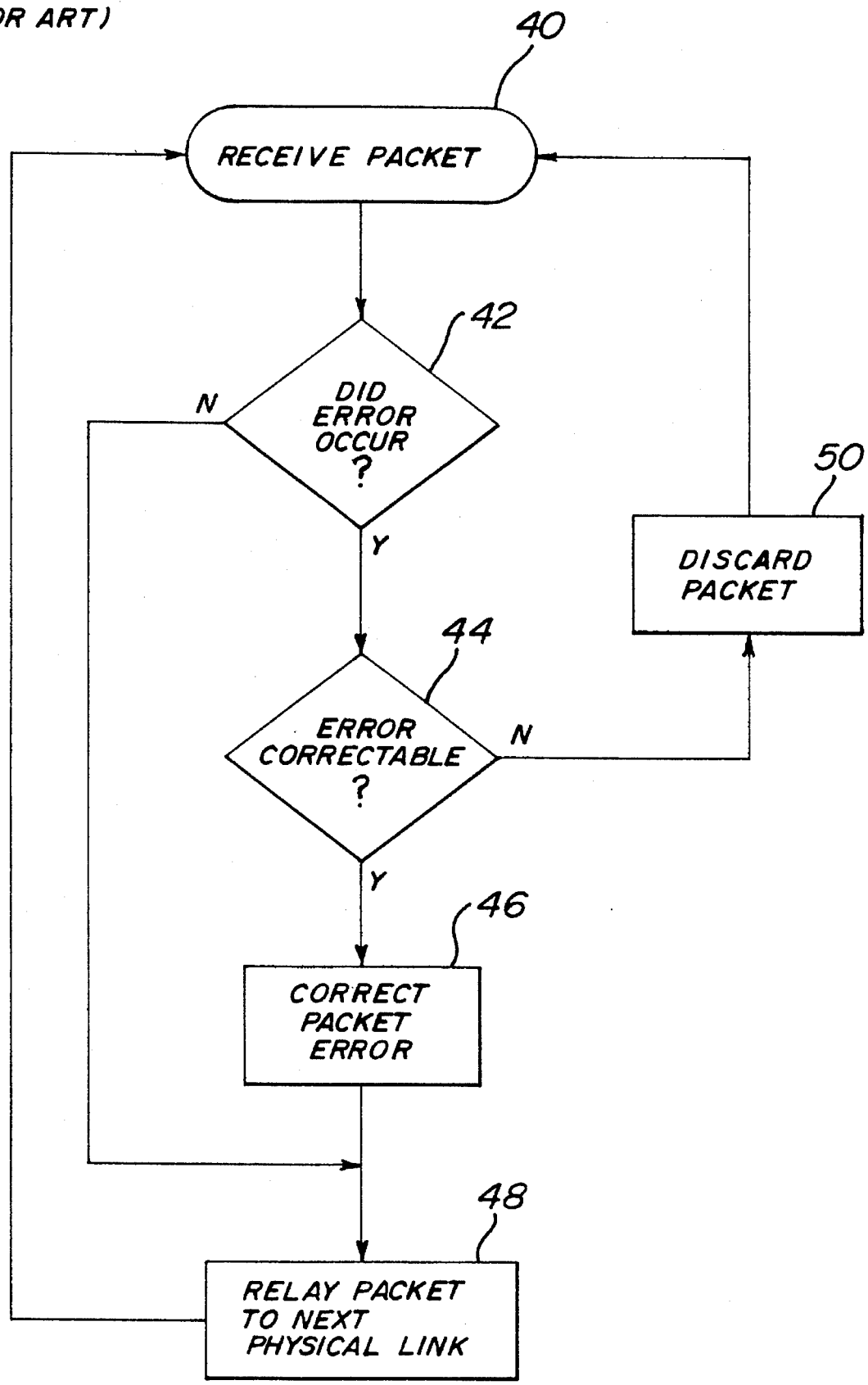
FIG. 2 is a flow diagram illustrating a prior art method for handling uncorrectable packet errors in a multi-hop communications system.

As mentioned in the Background of the Invention, in prior art multi-hop communications systems, when an uncorrectable packet error is detected by the receiving equipment (e.g., error correction apparatus 30) of a particular physical link, the packet is simply discarded, and therefore, is not relayed to the next physical link for continued transmission through the system. FIG. 2 illustrates the operation of the receiving equipment of a prior art multi-hop communications system in greater detail. As shown, at step 40 a packet is received by a receiver (e.g., receiver 28) at the terminal end of the physical link, and at step 42, an error correction apparatus (e.g., apparatus 30) employs the appended error correcting code to determine whether an error occurred during transmission of the packet over that physical link. If no error is detected, the packet is simply relayed to the next physical link at step 48. If, however, an error is detected, control passes to step 44.

At step 44, the error correcting apparatus determines whether the error is correctable. If the error is correctable, the error is corrected at step 46 and the packet is then relayed to the next physical link at step 48. If, however, the error is uncorrectable, the packet is discarded at step 50 and control passes back to step 40 for processing of the next packet. The corrupted packet is not relayed to the next physical link. The communications system must therefore deal with the loss of that packet.

Although uncorrectable errors in the data of a packet may indeed render the packet useless to a reception site, Applicants have recognized that certain types of data, such as coded video data, may be useful despite an uncorrectable data error. Accordingly, it would be desirable to allow corrupted packets to continue through the communications system to the reception site despite the existence of an uncorrectable data error. Applicants have recognized, however, that some mechanism must be provided for alerting the reception site that an uncorrectable error occurred during transmission over one or more of the physical links in the system. A corrupted packet cannot simply be allowed to propagate through the system. Each physical link assumes that the packets provided to that link are valid, and any information concerning the integrity of a packet is lost when the packet is relayed to a subsequent physical link. Thus, if a current physical link receives a corrupted packet from the previous link, and no errors occur during transmission over that current link, the current link will assume the packet is error free. A reception site will therefore have no way of knowing whether a packet is valid. As explained, prior art systems simply avoid this problem by discarding packets that contain uncorrectable data errors.

The present invention is directed to a method that allows packets containing uncorrectable data errors to continue to propagate to a reception site by providing a means for indicating to the reception site that an uncorrectable error occurred during transmission of that packet. Essentially, in accordance with the method of the present invention, a single bit in each packet, or alternatively, a group of bits, is pre-defined as a "packet error indicator" At the transmission site, the pre-defined bit in each packet is set to a first value, which indicates that no data errors are present in that packet, i.e., that the packet data is valid. At each successive physical link in the communications system, if an uncorrectable error is detected in a given packet, the packet error indicator bit in that packet is set to a second value which indicates that an uncorrectable error exists, i.e., that the packet data is invalid. Once set to the second value, the pre-defined bit(s) may not be reset by any subsequent physical links. A device at the reception site may, upon receiving the packet, examine the value of the pre-defined bit to determine the integrity of the data in the packet. As explained, the data in a packet may be useful to the reception site despite the existence of an uncorrectable error.

Recently, Applicants and their Assignee proposed the method of the present invention, as defined by the appended claims, to the International Organization for Standardization (ISO) for inclusion in the recently adopted MPEG-2 Systems standard, and the method of the present invention, as defined by the appended claims, has been adopted as part of that standard. Accordingly, a preferred embodiment of the present invention is described herein in the context of a communications system wherein data is transmitted in accordance with the MPEG-2 System standard. The MPEG-2 Systems standard is set forth in detail in the MPEG-2 Systems Committee Draft (ISO/IEC JTC1/SC29/WG11/N0601, November, 1993) [hereinafter "MPEG-2 Systems Committee Draft"], which is hereby incorporated by reference.

Figure 3:
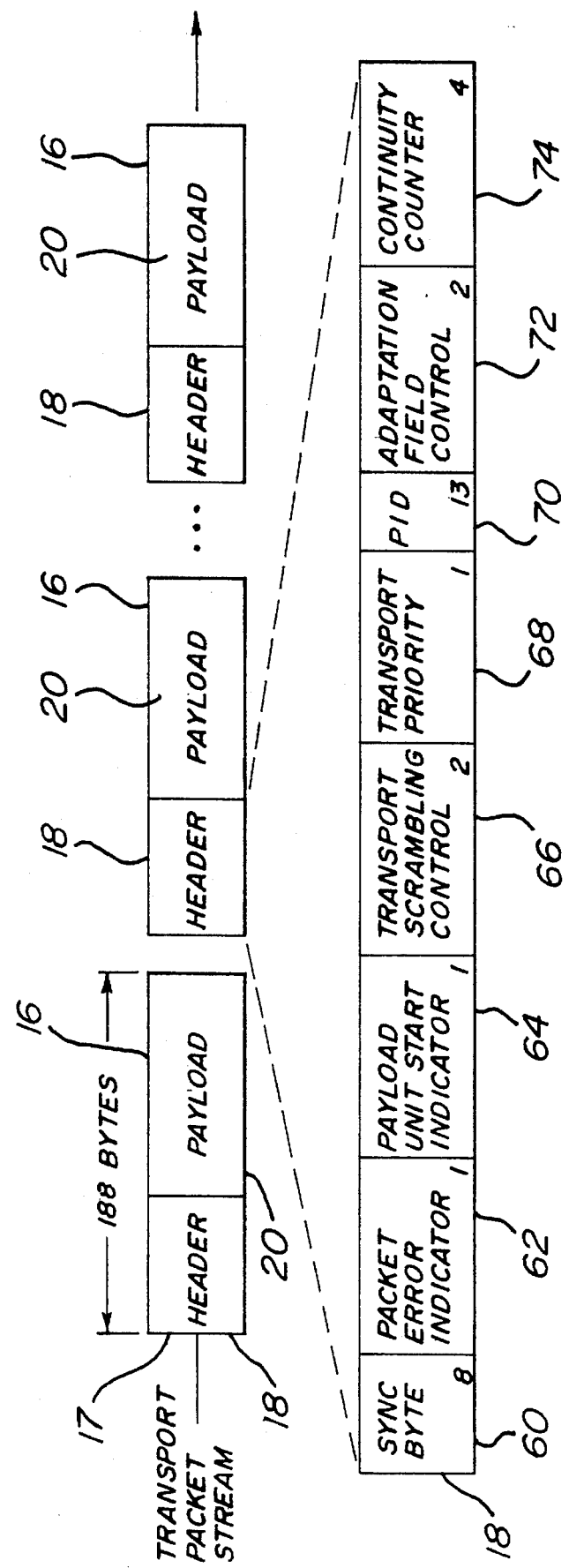
FIG. 3 illustrates the content and arrangement of a packet header in accordance with one embodiment of the present invention.

The MPEG-2 Systems standard specifies a packet structure for the transmission of data from a transmission site to a reception site. Each packet is referred to therein as a "Transport Packet" and a sequence of transport packets comprise a "Transport Packet Stream". An exemplary Transport Packet Stream 17 is illustrated in FIG. 3. As shown, the Transport Packet Stream 17 comprises a number of successive Transport Packets 16. As explained in the Background of the Invention, and as is common in most packet-based systems, each Transport Packet 16 comprises a header portion 18 and a payload portion 20. FIG. 3 further illustrates the general content and arrangement of the header portion 18 of an MPEG-2 Transport Packet. As shown, the header portion 18 of each Transport Packet 16 comprises a number of fields, including a sync byte field 60, a payload unit start indicator field 64, a transport scrambling control field 66, a transport priority field 68, a packet identifier (PID) 70 field, an adaptation field control field 72 and a continuity counter field 74. The small number in the bottom right hand corner of each field indicates the number of bits allocated for that field. The function of each of these fields is described in detail in the aforementioned MPEG-2 Systems Committee Draft.

In accordance with a preferred embodiment of the present invention, a one bit field 62 of each header 18 is pre-defined as a "packet error indicator" (note: the MPEG-2 Systems Committee Draft designates this field as a "Transport Error Indicator"). Whether a packet contains an uncorrectable bit error may be communicated through the value of the packet error indicator field 62. A first value may indicate that no error is present in the packet, and a second value may indicate that the data in the packet contains an uncorrectable error. In the preferred embodiment, the first and second values are '0' and '1', respectively. It is understood, however, that in other embodiments, different bit values may be used to indicate the presence or absence of packet errors. Additionally, in other embodiments, the packet error indicator field 62 could comprise a group of bits.

According to the method of the present invention, prior to transmission of each packet 16 from the transmission site, the packet error indicator field 62 of each packet 16 is set to the first value, e.g. '0', indicating that the packet data is free of errors. The packet error indicator field 62 of each packet may be set or "initialized" by the encoder 14 of FIG. 1 as it constructs each successive packet. Referring now to FIG. 4, the following additional steps are performed at each successive physical link in the communications system. At step 80 a packet transmitted over the physical link is received at the terminal end thereof. At step 82, an apparatus, e.g. the error correcting apparatus 30 of FIG. 1, detects whether an error occurred during transmission of that packet over the physical link. If no error is detected, control passes directly to step 88 where the packet is simply relayed to the next physical link. If, however, an error is detected, control passes to step 84.

At step 84, the error correcting apparatus determines whether the error is correctable. If the error is correctable, the error is corrected at step 86 and the packet is then relayed to the next physical link at step 88. If, however, the error is uncorrectable, control passes to step 90. At step 90, the packet error indicator field (i.e., bit) 62 in the header portion 18 of the packet is set to the second value, e.g. '1', to indicate that at least one uncorrectable bit error is present in the data of that packet. After setting the packet error indicator field 62, the packet 16 may then be relayed to the next physical link. According to the present invention, once the packet error indicator field 62 of a given packet 16 has been set to the second value, indicating that an uncorrectable error has occurred, the packet error indicator field 62 may not be reset to the first value unless the data in error is somehow corrected.

Each packet will eventually reach its destination at the reception site. A decoder at the reception site (e.g., decoder 32 of FIG. 1) may, upon receiving a given packet, examine the value of the packet error indicator field 62 in the header portion 68 of the packet to determined the integrity of the data contained in that packet.

As the foregoing illustrates, the present invention is directed to a method of providing packet error indication in a multi-hop communications system. In particular, the present invention overcomes the deficiencies in prior art systems by providing a means for indicating to a reception site whether an uncorrectable error occurred during transmission of a packet over one of the physical links in the system. By providing such an indication, the method of the present invention avoids the need to discard packets whenever an uncorrectable error occurs. As explained above, in some instances, the data in a corrupted packet may be useful at a reception site despite the presence of an uncorrectable bit error.

It is understood that changes may be made to the embodiments described above without departing from the broad inventive concepts thereof. Accordingly, this invention is not limited to the particular embodiments disclosed, but is intended to cover all modifications that are within the scope and spirit of the invention as defined by the appended claims.

What is claimed is:

1. In a packet-based multi-hop communications system wherein packets of data are transmitted from a transmission site to a reception site via a plurality of successive physical links, and wherein each successive physical link employs a data link layer unique to that physical link to provide error correction of packets transmitted over that physical link, and wherein the data link layers of some of said physical links may be different, a method of indicating to the reception site whether an error occurred during transmission of a particular packet over one of said physical links, said method comprising the steps of:

setting a pre-defined group of bits in said packet to a first value at said transmission site, said first value being indicative of no errors in the data of said packet;

performing the following steps at each successive physical link after transmission of said packet over that physical link:

(a) detecting, via the data link layer employed by that physical link, whether any uncorrectable errors occurred in the packet during transmission over that physical link;

(b) extracting the packet from the data link layer employed by the physical link;

(c) if an uncorrectable error is detected, setting the pre-defined group of bits in the extracted packet to a second value wherein the second value is indicative of an uncorrectable error in the data of said extracted packet; and (d) relaying said extracted packet to the next successive physical link, wherein the next successive physical link employs another data link layer to transmit said packet over that physical link, and wherein a device at the reception site may, upon receiving the packet, examine the value of the pre-defined group of bits to determine whether an uncorrectable error occurred during transmission of the packet over one of said physical links.

2. A method according to claim 1 wherein the pre-defined group of bits comprises one bit.

3. A method according to claim 1 wherein the pre-defined group of bits comprise a field in a header portion of said packet.

4. In a packet-based multi-hop communications system wherein packets of data are transmitted from a transmission site to a reception site via a plurality of successive physical links, and wherein each successive physical link employs a data link layer unique to that physical link to provide error correction of packets transmitted over that physical link, and wherein the data link layers of some of said physical links may be different, a method for use at a physical link for providing an indication to the reception site that an uncorrectable error occurred in the data of a packet during transmission of that packet over that physical link, said method comprising the steps of:

(a) detecting, via the data link layer employed by that physical link, whether any uncorrectable errors occurred in the data of said packet during transmission of the packet over that physical link;

(b) extracting the packet from the data link layer employed by the physical link;

(c) if an error occurred, setting a pre-defined bit in said packet to a pre-determined value, said pre-determined value being indicative of an uncorrectable error in the data of said packet; and (d) relaying said packet to a next successive physical link in said communications system, wherein the next successive physical link employs another data link layer to transmit said packet over that physical link.

5. A method according to claim 4 wherein prior to transmission of said packet from the transmission site, the pre-defined bit in said packet is set to a value indicative of no errors in the data of said packet.

6. A method according to claim 4 wherein the pre-defined bit is located in a header portion of said packet.

* * * * *